March 4, 1958     R. E. KENNEDY     2,825,897
SPEED INDICATOR ALARM SYSTEM
Filed May 14, 1956     2 Sheets-Sheet 1
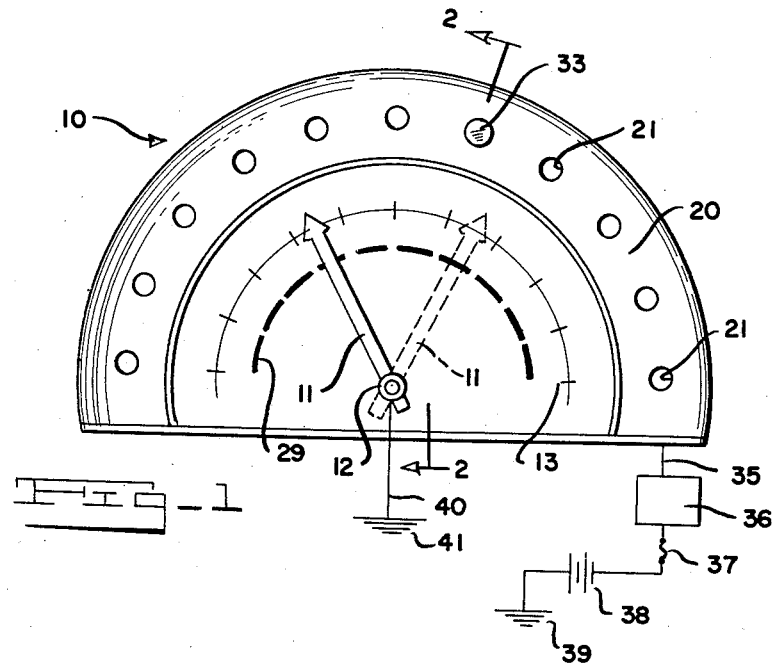
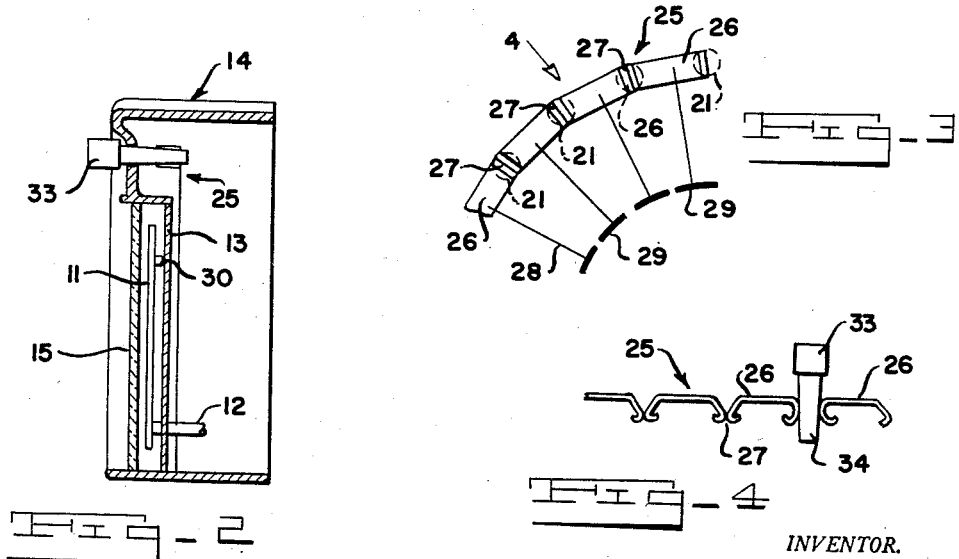
INVENTOR.
ROBERT E. KENNEDY
BY
Cullen & Cantor
ATTORNEYS March 4, 1958
R. E. KENNEDY
2,825,897
SPEED INDICATOR ALARM SYSTEM
Filed May 14, 1956
2 Sheets-Sheet 2
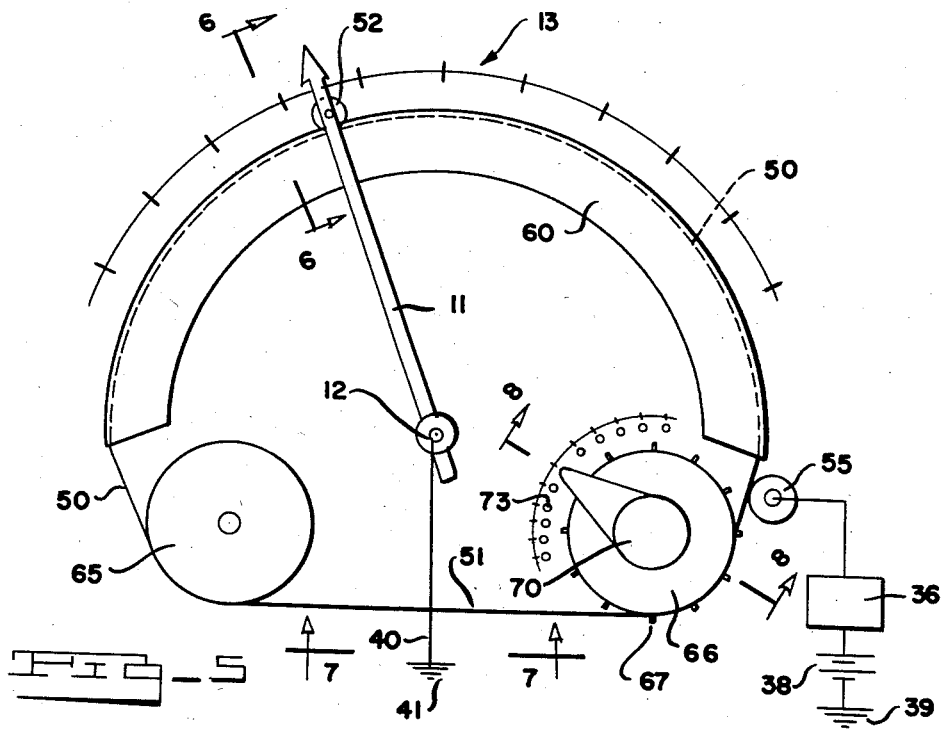
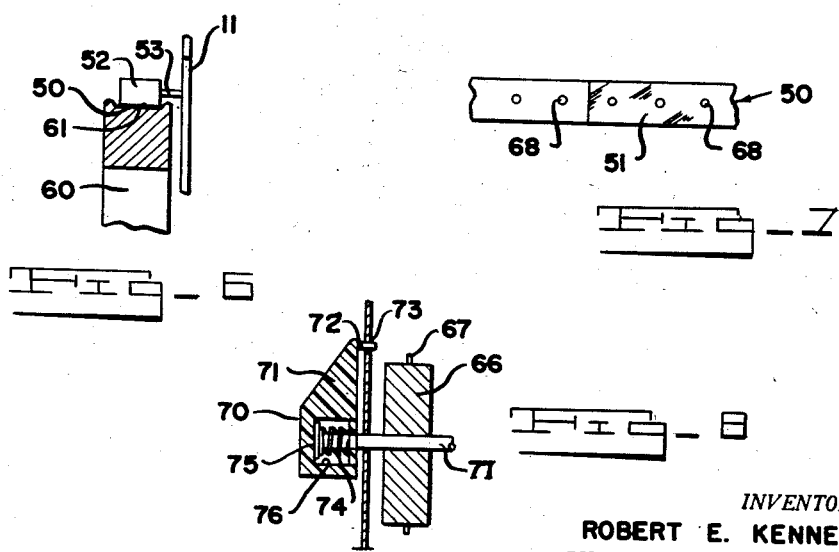
INVENTOR.
ROBERT E. KENNEDY
BY
Cullen & Canton
ATTORNEYS United States Patent Office 2,825,897
Patented Mar. 4, 1958

2,825,897

SPEED INDICATOR ALARM SYSTEM

Robert E. Kennedy, Detroit, Mich., assignor of forty percent to Bert S. Kennedy, Detroit, Mich.

Application May 14, 1956, Serial No. 584,603

7 Claims. (Cl. 340—266)

This invention relates to a speed indicator alarm system and more particularly to an alarm adapted to be fitted to vehicle speed indicators so that an audible alarm is given when the speed of the vehicle reaches any predetermined point.

In the speed indicators most commonly used today in automobiles and other types of vehicles, a dial is provided upon which various speeds are imprinted and an indicator arm travels over this dial in response to the speed of the vehicle so that the operator may know how fast he is going. However, unless the operator constantly watches the speed indicator, he is quite likely to exceed any predetermined speed, such as required speed limits without being aware of this excessive speed. Thus, since it is impractical for the vehicle operator to constantly watch his speedometer while at the same time driving carefully, it is an object of my invention to provide an audible alarm system which may be set at any predetermined speed so that when the vehicle reaches this speed an audible alarm is given.

In addition, it is an object of my invention to form an alarm system whereby when the speed of a vehicle exceeds a predetermined point, an alarm rings constantly regardless of the speed of the vehicle over the predetermined amount and stops ringing only when the vehicle speed reduces below the predetermined point.

Still a further object of my invention is to provide an alarm system for vehicles whereby the alarm is triggered by the speed indicator arm so that when the arm in the course of normal operation of the speed indicator reaches any predetermined position on the dial face of the indicator, it functions to close an electrical circuit which actuates an alarm.

These and other objects of my invention will become apparent upon reading the following description of which the attached drawings form a part.

Referring to the drawings, in which:

Fig. 1 is a front view, partially schematic, of a speed indicator alarm built into a common type speed indicator.

Fig. 2 is a cross sectional view taken on arrows 2—2 of Fig. 1.

Fig. 3 is a view of the electrical stripping within the speed indicator, and

Fig. 4 is a view taken on arrow 4 of Fig. 3 to show a top view of the electrical stripping.

Fig. 5 is a schematic view of a modification,

Fig. 6 is a view taken in the direction of arrows 6—6 of Fig. 5, and,

Fig. 7 and Fig. 8 are likewise taken on arrows 7—7 and 8—8, respectively of Fig. 5.

With reference first to the modification shown in Figs. 1–4 of the drawings, a speed indicator or speedometer generally designated at 10, is provided with the common type of indicator arm 11 mounted for pivotal movement upon a shaft 12 in response to the motion and velocity of a vehicle. A dial card 13 is located in back of the indicator arm 11 and it is upon this dial card that the gradations of speed are printed. For example, the indicator shown in Fig. 1 might be used in an automobile and is divided into speed ranging from 0 to 100 miles per hour.

The indicator is contained within a casing 14 having a glass front 15 so that the operator of a vehicle may see through the glass to see where the indicator arm 11 is pointing and to thus see what the speed of the vehicle is at any given time. This is common type construction and does not form any part of my invention. The operating mechanism for operating and positioning the indicator arm 11 has been omitted from the drawings and from this description since these are well known to those skilled in the art and moreover, may be varied without departing from this invention.

At the peripheral face portion of the casing 14, indicated as 20, a series of openings 21 are provided. These openings are uniformly spaced along the peripheral face 20 and correspond to various speeds shown upon the dial face 13.

Behind the face 20, an electrical conductive strip generally designated as 25 is positioned. This strip encompasses the area of arcuate travel of the speed indicator arm 11. This electrical conductive strip is formed of small sections 26 formed of a resilient electrical conductive material, which may be any common resilient metallic materials, which as seen in Fig. 4, is constructed with the ends of each section being bent toward the next section to form a contact at 27 between each succeeding section. Thus, each section is normally in contact at 27 with the next succeeding section to form a continuous electrical conductor. Each section is connected by a thin wire 28 to an electrical conductive area 29 which may be in the form of a metallic coating printed upon the dial indicator face 13 of the speed indicator. These areas are separated slightly from each other and thus form a non-continuous electrical path along the face of the dial indicator 13.

An electrical contact block 30 secured to the back of the indicator arm 11 is arranged to rub along the path formed by the areas 29 on the dial face. Thus, the contact block 30 is constantly in contact with the various conductive areas 29, but the spacing between the areas 29 is such that when the contact block passes from one section to the next section, electrical contact is broken for a brief interval in the travel of the block 30.

A jack plug 33 is formed to fit into the openings 21 and is provided with a shank 34, formed to fit between the section ends so as to separate the ends of any one pair of contacting sections 26. Thus, the electrical circuit formed by the contact strip 25 may be interrupted at any point between succeeding sections by manual insertion of the jack plug 33 into the opening 21 so that the shank 34 separates the section ends. The operation of this will be described below.

A complete electrical circuit is formed by means of a conductor 35 secured at one end to the conductive strip 25 and then leading to an electrical audible alarm 36, such as a common buzzer, and through a fuse 37 to the electrical power source 38 of the vehicle and then to ground 39. Likewise, the indicator arm 11 is of metallic material or has a metallic coating formed thereon so as to become conductive whereby the block 30, the arm 11 and then a conductor 40 to ground 41 form the opposite side of the electrical circuit.

In operation, the operator of the vehicle selects any pre-determined speed at which he wishes his alarm to ring. Thus, for example he may select the speed of 60 miles per hour and thereupon insert the jack plug 33 into the opening 21 opposite the indication of 60 miles per hour on his indicator card 13. Below 60 miles per hour the fluctuations of the indicator arm 11 will have no effect upon the electrical circuit because the conductive strip 25 is interrupted at the 60 mile per hour point. However, when the vehicle reaches 60 miles per hour or exceeds 60 miles per hour, the rubbing block 30 rubbing upon the conductive area 29 makes contact with the portion of the strip 25 between the jack plug and the beginning of the electrical circuit 35 and thus closes the circuit and causes the alarm 36 to become actuated. The alarm 36 will continue ringing as long as the arm 11 continues either at 60 miles per hour or above 60 miles per hour.

It can be seen that the predetermined speed can be selected at any point that the operator wishes simply by manually removing the jack plug 33 and inserting it into a different opening.

In Fig. 5, a modified form of speed indicator is schematically shown. This indicator is provided with the same indicator arm 11 and pivotal connection 12 and card 13 as shown in Fig. 1. In this case, the arm is also electrically connected by a line 40 to ground 41. However, instead of relying upon an electrical conductive strip which may be broken at any point by a jack plug, this modification utilizes an endless belt 50 provided with a conductive coating 51 with the remainder of the belt 50 being non-conductive. The indicator arm 11 is provided with a roller 52 mounted upon a pivot 53 connected to the indicator arm 11. Thus, the movement of the indicator arm 11, with the roller 52 being in constant contact with the belt 50, completes an electrical circuit when the roller 52 rolls upon the electrically conductive area 51 of the belt 50. The circuit is completed by a contact roller 55 electrically connected to the audible alarm signal 36 and the vehicle electrical power source 38 and then to ground 39.

In order to support the endless belt 50 and in order to provide a means for adjusting the position of the coated portion 51 so that any particular speed may be selected by the operator to actuate the alarm 36, a track 60 is provided with a surface 61 upon which the belt rides. The track 60 is curved to correspond to the arc of movement of the arm 11. Thus, the roller 52 constantly bears down upon the surface of the belt 50 which in turn rides upon the track surface 61.

When the belt comes off the track, at least one roller 65, which is an idler, receives the belt and the belt continues to a second control roller 66 which is provided with spaced peripheral and axially extending pins 67. These pins engage in openings 68 spaced throughout the length of the belt 50.

Thus, manual rotation of the control roller 66 causes the interengaging pins and openings, 67 and 68, to move the belt so that the coated area 51 begins at any predetermined speed indication on the dial cord 13.

In order to conveniently rotate the control roller 66, a handle 70 is fixed to the roller by means of a shaft 77 which also serves as a mounting means for the roller 66. The handle is provided with an extension 71 having a pin 72 adapted to fit into spaced openings 73 formed in the dial card 13. These spaced openings are arranged next to printed speed designations which correspond to the speed designations of the dial indicator arm.

The shaft 77 is headed at 75 and fits within a hollow opening or chamber 76 within the handle 70 and is spring biased by a coil spring 74 so that the handle may be pulled away from the speed indicator surface to disengage the pin 72 from the openings 73 and then to rotate the handle to any other position after which the pin 72 is reset into a different opening 73.

This construction makes it possible to rotate the handle 70 in accordance with indicia which indicate a predetermined speed and also to lock the handle 70 at any particular point whereby the roller 66 is also locked against motion. In this manner, the belt 50 has been moved along its track 60 so that the metallic coated or electrically coated area 51 begins at any predetermined speed.

For example, if the operator desired to have his alarm signal at 60 miles per hour, he would rotate the handle 70 until the handle extension pointed at 60 on the indicia printed near the handle and then would slip pin 72 into the hole next to the printed word 60 in order to lock both the handle and the roller 66 as well as the belt 50.

In conclusion, it can be seen that the construction provided results in a speed indicator alarm which is actuated by the ordinary indicator arm 11 of an ordinary speed indicator and which at the same time provides an audible signal which signal continues for as long as the vehicle exceeds any predetermined speed.

This invention may be further developed within the scope of the following attached claims and accordingly it is desired that the foregoing description be read as being illustrative of embodiments of my invention and not in a strictly limiting sense.

I claim:

1. A vehicle speed indicator alarm system for a speed indicator having a pivotally mounted indicator arm movable in response to the varying speeds of the vehicle, comprising an elongated belt movably mounted behind and near the indicator arm, a portion of said belt having a continuous electrical conductive surface, and means for moving the belt to locate the conductive portion of the belt in various predetermined positions; a contact means formed on the indicator arm for making continuous contact with the surface of the belt; and an electrical circuit formed by the coated portion of the belt, an electrical connection to said conductive portion, an electrically actuated alarm, a source of electrical power and the contact means on the indicator arm, whereby the circuit is closed when the contact means contacts the conductive portion of the belt to actuate the alarm.

2. A vehicle speed indicator alarm system for a speed indicator having a pivotally mounted indicator arm movable in response to the speed of the vehicle, comprising an endless belt arranged in a plane parallel to the plane of movement of the indicator arm and closely spaced from the indicator arm, means supporting the belt for movement in the plane parallel to the plane of the movement of the indicator arm; electrical conductive contact means on the arm arranged for continuous contact with the belt surface; and a portion of the belt surface being of a continuous electrical conductive material; an electrical circuit formed between the arm contact means and the belt conductive surface through an electrically actuated alarm and an electrical power source, so that when the contact means contacts the belt conductive surface the circuit is closed to actuate the alarm.

3. A vehicle speed indicator alarm system as defined in claim 2, and said means for supporting the belt comprising a pair of spaced rollers over which the belt is passed, and means formed on one of the rollers and on the belt for interlocking the belt and the one roller whereby rotation of said one roller causes the belt to move in accordance with this rotation.

4. A vehicle speed indicator alarm as defined in claim 3, and said interlocking means consisting of a plurality of spaced pins secured to the peripheral surface of the roller and extending radially therefrom and a plurality of openings formed in the belt and arranged for the reception of the successive pins as the roller is rotated.

5. A vehicle speed indicator alarm as defined in claim 4 and a handle connected with the roller for manual rotation of the roller by rotation of the handle, said handle being provided with stop means for fixing the handle and the attached roller in any desired position.

6. A vehicle speed indicator alarm as defined in claim 2 and said contact means on the indicator arm consisting of a roller secured to the arm on an axial pivot extending normal to the arm for continuous rolling contact with the belt.

7. A vehicle speed indicator as defined in claim 2 and said belt support means comprising a track formed of non-conductive material and curved to the arc of travel of the indicator arm and extending substantially throughout the length of arcuate travel of the indicator arm, for supporting the belt upon the top surface of the track, and at least one roller rotatably mounted at each end of the track to receive and support the belt portions not positioned on the track.

References Cited in the file of this patent

UNITED STATES PATENTS

| | | |
|---|---|---|
| 1,547,909 | Earle | July 28, 1925 |
| 2,162,166 | Gorrien | June 13, 1939 |
| 2,258,369 | Stevenson | Oct. 7, 1941 |
| 2,433,895 | Fairhurst | Jan. 6, 1948 |
| 2,504,582 | Pugin | Apr. 18, 1950 |